United States Patent [19]

Lindner et al.

[11] 4,272,428

[45] Jun. 9, 1981

[54] PLASTICIZED VINYL CHLORIDE POLYMER

[75] Inventors: Christian Lindner, Cologne; Carlhans Süling; Herbert Bartl, both of Odenthal; Dietrich Hardt; Karola Brudermanns, both of Leverkusen, all of Fed. Rep. of Germany

[73] Assignee: Bayer Aktiengesellschaft, Leverkusen, Fed. Rep. of Germany

[21] Appl. No.: 41,546

[22] Filed: May 23, 1979

[30] Foreign Application Priority Data

May 26, 1978 [DE] Fed. Rep. of Germany ....... 2823161

[51] Int. Cl.³ .................. C08K 5/04; C08L 69/00
[52] U.S. Cl. .................. 260/31.2 R; 260/31.8 R
[58] Field of Search .................. 260/31.8 R, 31.2; 525/466

[56] References Cited

U.S. PATENT DOCUMENTS

| | | | |
|---|---|---|---|
| 2,647,099 | 7/1953 | Smith, Jr. ...................... | 260/31.8 |
| 2,863,854 | 12/1958 | Wilson .......................... | 525/439 |
| 3,167,524 | 1/1965 | Fauck ........................... | 260/31.8 |
| 3,491,066 | 1/1970 | Petropoulos et al. ............ | 525/439 |
| 3,554,742 | 1/1971 | Gromza et al. ................. | 525/466 |
| 4,137,221 | 1/1979 | Hara et al. ..................... | 525/439 |

OTHER PUBLICATIONS

A. K. Doolittle–Technology of Solvent and Plasticizers John Wiley & Sons, Inc. pp. 1006 & 1015–1954.

*Primary Examiner*—Joseph L. Schofer
*Assistant Examiner*—Peter F. Kulkosky
*Attorney, Agent, or Firm*—Connolly and Hutz

[57] ABSTRACT

A thermoplastic molding composition contains a mixture of 10 to 95% by weight of a vinyl chloride polymer and 90 to 5% by weight of an adipate/carbonate mixed ester which is the transesterification reaction product of an adipate-diol polyester having terminal hydroxyls and a bifunctional carbonic acid aryl ester. The composition has a favorable combination of physical properties which include good cold fracture behavior coupled with easy processability and good ageing characteristics.

4 Claims, No Drawings

PLASTICIZED VINYL CHLORIDE POLYMER

This invention relates to thermoplastic molding compositions of:
(1) from 10 to 95%, by weight, of a vinyl chloride polymer; and
(2) from 90 to 5%, by weight, of an adipate/carbonate mixed ester.

In one particular embodiment, the molding compositions additionally contain from 10 to 45%, by weight, based on the quantity of components (1) and (2), of: a copolymer of from 25 to 35%, by weight, of acrylonitrile and 75 to 65%, by weight, of butadiene or chlorinated polyethylene having a chlorine content of from 28 to 42%, by weight; a copolymer of from 40 to 80%, by weight, of vinyl acetate and from 60 to 20%, by weight, of ethylene; or a polyurethane of adipic acid polyester, $C_2$–$C_6$ diols as chain-extender and aromatic or aliphatic diisocyanates.

In the context of the present invention, "vinyl chloride polymers" are, in particular, polyvinyl chloride, copolymers of vinyl chloride with up to 20%, by weight, of copolymerisable compounds and graft polymers of vinyl chloride on ethylene/vinyl acetate copolymers (particularly having vinyl chloride contents of from 40 to 60%, by weight). Examples of compounds copolymerisable with vinyl chloride include:
(a) vinyl esters containing from 1 to 8 carbon atoms in the alkyl radical of the carboxylic acid;
(b) vinyl ethers containing from 3 to 7 carbon atoms;
(c) maleic acid anhydride;
(d) semi-esters of maleic acid with aliphatic alcohols containing from 1 to 8 carbon atoms in the alcohol radical;
(e) diesters of maleic acid with aliphatic alcohols containing from 1 to 8 carbon atoms in the alcohol radical.

In the context of the present invention, adipate/carbonate mixed esters are compounds corresponding to the following general formula:

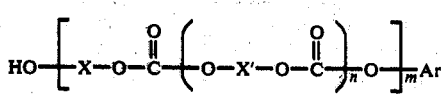

wherein
Ar is aryl of 6 to 18 carbon atoms;
X and X' represent residues of the reaction product of a polyhydric alcohol with adipic acid having a molecular weight of from 800 to 3500;
n represents an integer of from 0 to 10; and
m represents an integer of greater than 20, preferably from 22 to 100;
these compounds having an intrinsic viscosity [ether] (Staudinger Index) in tetrahydrofuran of from 0.8 to 2.5 dl/g.

Examples of polyhydric alcohols for the polyesters on which the residues X and X' are based include: ethylene glycol, 1,2- and 1,3-propylene glycol, 1,4- and 2,3-butylene glycol, 1,6-hexane diol, 1,8-octane diol, neopentyl glycol, cyclohexane dimethanol, 1,4-bis(hydroxymethyl-cyclohexane), 2-methyl-1,3-propane diol, di-, tri and tetra-ethylene glycol, dipropylene glycol and dibutylene glycol, optionally in admixture with one another.

The reaction products obtained from adipic acid and the alcohols are polyesters containing terminal hydroxyl groups. They have molecular weights of from about 800 to about 3500. The adipate/carbonate mixed esters are obtained from these polyesters by reaction with bifunctional carbonic acid aryl esters. These compounds correspond in particular to the following general formula:

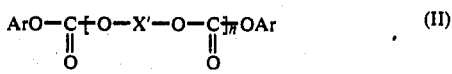

wherein
Ar represents an optionally substituted aryl radical containing from 6 to 18 carbon atoms, preferably 6 carbon atoms; and
n and X' are as defined above.

Such compounds are known.

Catalysts suitable for the reaction of the hydroxyl group-containing polyesters and the carbonic acid aryl esters are the transesterification catalysts, such as alkali metal or alkaline earth metal phenolates, alkali metal or alkaline earth metal alcoholates and tertiary amines, such as triethylene diamine, morpholine, pyrrolidine, pyridine and triethylamine, or metal compounds, such as antimony trioxide, zinc chloride, titanium tetrachloride and titanic acid tetrabutyl ester.

The catalyst is used in quantities of from 10 to 300 ppm, based on the total weight of the polycondensation components. The catalysts may be used in smaller quantities provided that, where the acidic catalysts are used, the starting products do not contain any basic impurities and, where the basic catalysts are used, starting products do not contain any acidic impurities. It is preferred to use the catalysts in the smallest possible quantities to prevent the reaction products from becoming coloured.

The reaction is preferably carried out in the absence of solvents. However, the reaction may be carried out in the presence of solvents which are inert under the reaction conditions, such as hydrocarbons, particularly aromatic hydrocarbons.

The reaction time is determined by the reaction temperature, by the type and quantity of catalyst used and by the required molecular weight of the carbonate group-containing polyester. In general, reaction times of from 2 to 48 hours, preferably from 4 to 24 hours, are sufficient.

The volatile condensation products formed may be removed during the reaction by distillation where the process is carried out in batches and by fractional distillation where the process is carried out continuously. Preferably, a mixture of polyester diol and bifunctional carbonic acid aryl ester, preferably diphenyl carbonate, or a mixture of diphenyl carbonate and compounds corresponding to general formula (II) is polycondensed at from 110° to 170° C. in the presence of sodium phenolate as catalyst and the viscosity of the polycondensation mixture is subsequently increased at 170° C. and higher by the addition of a bifunctional carbonic acid aryl ester corresponding to general formula (II) preferably with n≧1, with simultaneous removal of volatile condensation products by distillation. It has been found to be advantageous to carry out the polycondensation reaction in high viscosity reactors, such as kneaders or screw reactors.

The polycondensation reaction may be terminated in known manner, for example by lowering the reaction temperature, by deactivating or removing the catalyst or by the addition of so-called "stoppers". Thus, it has proved to be advantageous to use carboxylic acid aryl esters as stoppers in the case of terminal alcohol groups and alcohols as stoppers in the case of terminal aryl carbonate groups. If bifunctional compounds are used as stoppers, it is possible by carefully measured addition to terminate the polycondensation reaction and at the same time to increase the average molecular weight.

The intrinsic viscosity (Staudinger Index) $[\eta]$ was measured in tetrahydrofuran at 25° C. and is expressed in dl/g. For a definition of intrinsic viscosity, see H. G. Elias "Makromolekule", Huthig & Wepf-Verlag, Basel, page 265.

The mixtures according to the present invention may be produced by initially mixing powder-form vinyl chloride polymer with the adipate/carbonate mixed ester, optionally in the presence of stabilisers, lubricants, pigments. Mixing is, of course, easier if the adipate/carbonate mixed ester is in powder form. The mixture may then be homogenised on mixing rolls at from 150° to 200° C., run off in the form of a sheet and granulated for further processing. The components may even be mixed in kneaders which either discharge the plasticized molding composition in strand form or directly granulate it, or homogenised in mixing extruders, followed by a granulator. In this case, it is even possible directly to extrude finished articles. The molding composition produced on mixing rolls or in kneaders may be directly further processed on calenders. Thermoplastic mixtures of the type in question have the character of flexible PVC. The same also applies to the granulates produced from them for further processing.

The molding compositions according to the present invention are stabilised in basically the same way as vinyl chloride polymers, for example using Ba/Cd-, Pb-, Sn-, Zn-, or organic stabilisers.

The production and processing of PVC and mixtures of PVC with a variety of different components are described in "Kunststoff-Handbuch" by Krekeler-Wick, Carl Hanser Verlag, Munich (1963).

The molding compositions according to the present invention may be processed by the methods normally used for processing polyvinyl chloride, for example by injection molding, extrusion or hollow-body blowing. They are preferably used for applications imposing particularly stringent demands on flexible polyvinyl chloride in regard to flexibility, cold strength and resistance to plasticizer migration. One particular advantage of the molding compositions according to the present invention lies in the complete transparency thereof and in the complete miscibility of the components.

The molding compositions according to the present invention may be further improved and are satisfactorily compatible with known high polymer PVC plasticizers. Such plasticizers include, for example, partially cross-linked butadiene/acrylonitrile copolymers (for example containing 20% of acrylonitrile) having a Mooney viscosity (ML 4, 100° C.) according to DIN 53 523 of from 70 to 90 (improvement in abrasion resistance and elasticity), polyurethanes (according to German Pat. No. 1,193,241) (improvement in resistance to solvents, abrasion resistance and fastness to light), chlorinated polyethylene (for example molecular weight 180,000, low pressure polyethylene) (improvement in flame resistance), ethylene/vinyl acetate copolymers (for example molecular weight 200,000 soluble in organic solvents) (improvement in light stability). The high polymer plasticiers may be added to the molding compositions according to the present invention in quantities of from 10 to 45%, by weight.

The molding compositions according to the present invention are distinguished by a particularly favorable combination of physical properties, for example favorable cold fracture behavior coupled with easy processibility and favorable ageing behavior.

Production of the adipate/carbonate esters (1) 2000 parts, by weight, of a polyester diol of adipic acid and a mixture of n-hexane-1,6-diol/neopentyl glycol in a ratio of 55:35 (average molecular weight $\overline{M}n$ 2000, as determined by measurement of the OH-number), 214 parts, by weight, of diphenyl carbonate and 0.12 part, by weight, of sodium phenolate are stirred under a vacuum of 1.5 Torr for 2 hours at 130° C. and for 1 hour at 150° C., volatile polycondensation products, consisting for the most part of phenol, being distilled off. As distillation continues, the temperature is increased to 180° C. for 4 hours, during which 20 parts, by weight, of a polytetrahydrofuran diol extended through —OCOO— bridges and containing terminal phenyl carbonate groups ($\overline{M}n$ of the polytetrahydrofuran 2000, degree of extension=2) are added, after which the reaction temperature is increased to from about 185° to 190° C. for 5 hours with slow stirring or kneading. The product, a colourless rubber-like mass, has a Staudinger Index $[\eta]$, as measured in THF, of 1.5.

(2) 1800 parts, by weight, of a polyester diol of adipic acid and n-hexane-1,6-diol (average molecular weight $\overline{M}n$ 1800, as determined by measurement of the OH-number), 214 parts, by weight, of diphenyl carbonate and 0.11 part, by weight, of sodium phenolate are stirred under a vacuum of 0.5 Torr for 2 hours at 130° C. and for 1 hour at 150° C., volatile polycondensation products, consisting for the most part of phenol, being distilled off. As distillation continues, the temperature is increased to 180° C. for 4 hours, during which 35 parts, by weight, of a polyester diol extended through —OCOO— bridges and containing terminal phenyl carbonate groups ($\overline{M}n$ of the polyester diol consisting of adipic acid and n-hexane-1,6-diol 2150, degree of extension=2) are added, after which the reaction temperature is increased to 190° C. for 4 hours with slow stirring or kneading, the reaction mixture is dissolved in 1 liter of toluene after cooling to 120° C., 20 parts, by weight, of the above-mentioned polyester diol are added with thorough stirring and the toluene evaporated off in vacuo, the internal temperature of the reaction mixture being slowly increased to 220° C. At this temperature, the reaction mixture is dried in vacuo for 2 hours, all the volatile products being carefully evaporated off. The resulting material has a Staudinger Index $[\eta]$, as measured in THF, of 0.92. It is in the form of a polymer which is colourless, opaque and crystalline at room temperature and which has a melting point of 52° C.

(3) 1000 parts, by weight, of a polyester diol of adipic acid and a mixture of n-hexane-1,6-diol/neopentyl glycol in a ratio of 65:35 (average molecular weight $\overline{M}n$ 2000, as determined by measurement of the OH-number), 107 parts, by weight, of diphenyl carbonate and 0.12 part, by weight, of sodium phenolate are stirred under a vacuum of 1.5 Torr for 2 hours at 130° C. and for 5 minutes at 150° C., volatile condensation products, consisting for the most part of phenol, being distilled off. After the mixture has been cooled to 130° C., a mixture of 900 parts, by weight, of a polyester diol of adipic acid and n-hexane-1,6-diol having an average molecular weight $\overline{M}n$ of 1800 (as determined by measurement of the OH-number) and 107 parts, by weight, of diphenyl carbonate is added, followed by stirring for 2 hours at 150° C. and for 2 hours at 160° C., with continued removal of volatile products by distillation. The temperature is then increased to 180° C. for 4 hours, during which 22 parts, by weight, of a polytetrahydrofuran diol extended through —OCOO-bridges and containing terminal phenyl carbonate groups ($\overline{M}n$ of the polytetrahydrofuran diol 2000, degree of extension=2) are added, after which the reaction temperature is increased for 2 hours to 185° C. and for 4 hours to 200° C. with slow stirring or kneading.

The product, which is in the form of a colourless rubber-like mass, has a Staudinger Index [$\eta$], as measured in THF, of 1.5.

(4) 2000 parts, by weight, of a polyester diol of adipic acid and a mixture of n-hexane-1,6-diol/neopentyl glycol in a ratio of 65:35 (average molecular weight $\overline{M}n$ 2000, as determined by measurement of the OH-number), 214 parts, by weight, of diphenyl carbonate and 0.12 part, by weight, of sodium phenolate are stirred under a vacuum of 1.5 Torr for 2 hours at 130° C. for 1 hour at 150° C., volatile polycondensation products, consisting for the most part of phenol, being distilled off. As distillation continues, the temperature is raised for 6 hours to 180° C. and for 2 hours to 195° C. The resulting product, in the form of a colourless rubber-like soft mass, has a Staudinger Index [$\eta$], as measured in THF, of 0.81.

(5) 1333.3 parts, by weight, of a polyester diol of adipic acid and diethylene glycol (average molecular weight $\overline{M}n=2666$, as determined by measurement of the OH-number), 107 parts, by weight, of diphenyl carbonate and 0.07 part, by weight, of sodium phenolate are stirred under a vacuum of 1.5 Torr for 1 hour at 130° C. and for another hour at 150° C., volatile polycondensation products being distilled off. After heating to 175° C., 58 parts, by weight, of a polyester containing terminal phenol carbonate groups (polyester of adipic acid and hexane diol, $\overline{M}n=2000$) are added. The mixture is then maintained at 175° C. for 3 hours with continued kneading. The resulting rubber-like product has a Staudinger Index [$\eta$], as measured in THF, of 1.32.

(6) 15.7 parts, by weight, of a polyester diol of adipic acid and diethylene glycol (average molecular weight $\overline{M}n=2666$, as determined by measurement of the OH-number), 862.8 parts, by weight, of a polyester diol of adipic acid and a mixture of n-hexane-1,6-diol/neopentyl glycol in a ratio of 65:35 (average molecular weight $\overline{M}n=2000$, as determined by measurement of the OH-number), 113.3 parts, by weight, of diphenyl carbonate and 0.5 part, by weight, of sodium phenolate are mixed in a vacuum of 1.5 Torr for 1 hour at 130° C. and for another hour at 150° C., volatile polycondensation products being distilled off. The mixture is then maintained at a temperature of 175° C. with continued kneading and 66 parts, by weight, of a polyester containing terminal phenyl carbonate groups are added (polyester identical with the above-mentioned neopentyl glycol ester). After 4 hours at 175° C., a rubber-like product is obtained which has a Staudinger Index [$\eta$], as measured in THF, of 0.87.

(7) 539.3 parts, by weight, of a polyester diol of adipic acid and diethylene glycol (average molecular weight $\overline{M}n=2666$, as determined in the same way as in (6)), 539.3 parts, by weight, of a polyester of adipic acid and a mixture of n-hexane-1,6-diol/neopentyl glycol in a ratio of 65:35 (average molecular weight $\overline{M}n=2000$, as determined in accordance with (6)), 103.3 parts, by weight, of diphenyl carbonate and 0.05 parts, by weight, of sodium phenolate are reacted in vacuo with stirring under the same reaction conditions and with addition of the same polyester-bis-phenyl carbonate as in (6). A rubber-like product is obtained which has a Staudinger Index [$\eta$], as measured in THF, of 0.80.

(8) 2000 parts, by weight, of a polyester diol of adipic acid and a mixture of n-hexane-1,6-diol/neopentyl glycol in a ratio of 65:35 (average molecular weight $\overline{M}n=2000$, as determined by measurement of the OH-number), 214 parts, by weight, of diphenyl carbonate and 0.12 part, by weight, of sodium phenolate are stirred under a vacuum of 1.5 Torr for 2 hours at 130° C. and for 1 hour at 150° C., volatile polycondensation products, consisting for the most part of phenol, being distilled off. As distillation continues, the temperature is increased to 175° C. for 2.5 hours, during which 113 parts, by weight, of a polyester diol containing terminal phenyl carbonate groups are added ($\overline{M}n$ of the polyester diol 2000; consisting of adipic acid and a mixture of n-hexane-1,6-diol/neophentyl glycol in a ratio of 65:35). The reaction temperature is then increased to 180° C. Colourless rubber-like masses are obtained, the Staudinger Index values [$\eta$], as measured in THF, differing in dependence upon the reaction time at 180° C.

| Compound | Reaction time at 180° C. | [$\eta$] THF |
|---|---|---|
| a | 0.5 hour | 1.02 = LCH 840 A |
| b | 1.5 hours | 1.20 = LCH 840 A |
| c | 2 hours | 1.45 = LCH 1120 |
| d | 2.5 hours | 1.60 = LCH 1103 |
| e | 3 hours | 1.72 = LCH 843 A |

Molding compositions

EXAMPLE 1

Molding compositions of from 97 to 10 parts, by weight, of polyvinyl chloride and from 3 to 90 parts, by weight, of an adipate/carbonate mixed ester may be satisfactorily processed. 2%, by weight, of Ba/Cd-laurate (solid) and 0.2% of ester wax (solidification point from 70° to 74° C.) are added as combined stabiliser and lubricant. The molding compositions were mixed on mixing rolls for 10 minutes at 170° C., rolled out into 0.5 mm thick sheets and molded at 175° C. to form plates. The test specimens were punched out from these plates. All the plates obtained were transparent. A suspension polyvinyl chloride having a K-value of 70 was used. The mixtures produced and the advantageous physical properties thereof are shown in Tables 1 and 2 below.

TABLE 1

| Polyvinyl chloride parts, by weight | Polyester Parts, by weight | Production method | DIN 53505 Shore Hardness 15" A | D |
|---|---|---|---|---|
| 1. 97 | 3 | 8a | 100 | 83 |
| 2. 94 | 6 | | 100 | 83 |
| 3. 91 | 9 | | 100 | 82 |
| 4. 88 | 12 | | 100 | 82 |
| 5. 85 | 15 | | 100 | 81 |
| 6. 80 | 20 | | 100 | 78 |
| 7. 75 | 25 | | 100 | 71 |
| 8. 70 | 30 | | 98 | 57 |
| 9. 65 | 35 | | 93 | 43 |
| 10. 60 | 40 | | 81 | 29 |
| 11. 50 | 50 | | 63 | 16 |

TABLE 1-continued

| | | | | | |
|---|---|---|---|---|---|
| 12. | 40 | 60 | | 49 | 9 |
| 13. | 30 | 70 | | 34 | 6 |
| 14. | 20 | 80 | | 16 | 0 |
| 15. | 10 | 90 | | 7 | 0 |
| 16. | 97 | 3 | 8e | 100 | 81 |
| 17. | 94 | 6 | | 100 | 81 |
| 18. | 91 | 9 | | 100 | 81 |
| 19. | 88 | 12 | | 100 | 80 |
| 20. | 85 | 15 | | 100 | 79 |
| 21. | 80 | 20 | | 100 | 76 |
| 22. | 75 | 25 | | 100 | 68 |
| 23. | 70 | 30 | | 98 | 57 |
| 24. | 65 | 35 | | 90 | 39 |
| 25. | 60 | 40 | | 82 | 29 |
| 26. | 50 | 50 | | 67 | 21 |
| 27. | 40 | 60 | | 50 | 9 |
| 28. | 30 | 70 | | 36 | 4 |
| 29. | 20 | 80 | | 15 | 1 |
| 30. | 10 | 90 | | 3 | 0 |

| | DIN 53455 tensile strength MPa | Strain at 100% elongation MPa | Elongation at break % |
|---|---|---|---|
| 1. | 37.8 | — | 12 |
| 2. | 32.1 | — | 9 |
| 3. | 41.1 | — | 8 |
| 4. | 38.9 | — | 11 |
| 5. | 29.5 | — | 12 |
| 6. | 26.9 | — | 75 |
| 7. | 26.8 | 22.3 | 287 |
| 8. | 24.5 | 18.6 | 275 |
| 9. | 23.2 | 14.8 | 352 |
| 10. | 20.4 | 9.5 | 398 |
| 11. | 15.3 | 4.7 | 527 |
| 12. | 9.7 | 3.4 | 607 |
| 13. | 4.6 | 1.6 | 748 |
| 14. | 1.0 | 0.6 | 580 |
| 15. | 0.3 | 0.2 | 220 |
| 16. | 37.8 | — | 11.7 |
| 17. | 38.5 | — | 13.2 |
| 18. | 33.3 | — | 10.0 |
| 19. | 30.4 | — | 10.0 |
| 20. | 29.2 | — | 22.7 |
| 21. | 27.9 | — | 68.0 |
| 22. | 27.0 | 22.7 | 242.4 |
| 23. | 27.2 | 19.4 | 314.6 |
| 24. | 24.0 | 15.5 | 343.2 |
| 25. | 20.9 | 10.0 | 419.2 |
| 26. | 16.1 | 5.3 | 494.4 |
| 27. | 8.6 | 3.0 | 566.0 |
| 28. | 4.4 | 1.7 | 579.0 |
| 29. | 1.2 | 0.5 | 724.0 |
| 30. | 0.3 | 0.1 | 232.0 |

TABLE 2

| | Polyvinyl chloride parts, by weight | Polyester Parts by weight | Polyester Production method | DIN 53505 Shore Hardness 15" A | DIN 53505 Shore Hardness 15" D |
|---|---|---|---|---|---|
| 1. | 60 | 40 | 2 | 84 | 31 |
| 2. | 70 | 30 | 4 | 95 | 51 |
| 3. | 60 | 40 | 4 | 78 | 29 |
| 4. | 50 | 50 | 4 | 63 | 17 |
| 5. | 60 | 40 | 6 | 84 | 32 |
| 6. | 60 | 40 | 7 | 91 | 36 |
| 7. | 70 | 30 | 8b | 99 | 58 |
| 8. | 60 | 40 | 8b | 84 | 31 |
| 9. | 50 | 50 | 8b | 68 | 23 |
| 10. | 60 | 40 | 8c | 84 | 32 |
| 11. | 60 | 40 | 8d | 82 | 32 |
| 12. | 50 | 50 | 8d | 67 | 22 |

| | DIN 53455 tensile strength MPa | Strain at 100% elongation MPa | Elongation at break % |
|---|---|---|---|
| 1. | 21.6 | 10.2 | 382 |
| 2. | 24.3 | 17.3 | 328 |
| 3. | 18.9 | 7.7 | 420 |
| 4. | 12.0 | 4.3 | 440 |
| 5. | 21.1 | 10.3 | 399 |
| 6. | 21.2 | 12.2 | 364 |
| 7. | 26.7 | 21.7 | 263 |
| 8. | 22.7 | 12.4 | 377 |
| 9. | 10.2 | 5.8 | 430 |
| 10. | 23.2 | 10.9 | 405 |
| 11. | 20.9 | 10.3 | 393 |
| 12. | 16.4 | 5.8 | 513 |

EXAMPLE 2

Mixtures are prepared in the same way as in Example 1 from:

(A) suspension polyvinyl chloride (K-value 70);
(B) the adipate/carbonate mixed ester produced by method 8c; and
(C) a partially cross-linked butadiene/acrylonitrile copolymer (acrylonitrile content 29%); Mooney viscosity (ML4, 100° C.) DIN 53523: from 70 to 90.

The components are mutually compatible and give transparent moulded plates. The physical properties and constitution of the molding compositions are shown in Table 3.

TABLE 3

| | Composition parts by weight A | B | C | Shore hardness 15" DIN 53 505 A | D | Tensile strength DIN 53 455 MPa |
|---|---|---|---|---|---|---|
| 1. | 60 | — | 40 | 99 | 54 | 26.1 |
| 2. | 60 | 10 | 30 | 98 | 52 | 27.6 |
| 3. | 60 | 20 | 20 | 96 | 48 | 26.4 |
| 4. | 60 | 30 | 10 | 92 | 42 | 24.6 |
| 5. | 60 | 40 | — | 84 | 33 | 22.5 |

| | Strain at 100% elongation MPa | Elongation at break % | Tear Propagation resistance DIN 53 515 KN/m |
|---|---|---|---|
| 1. | 16.5 | 297 | 75 |
| 2. | 17.8 | 314 | 94 |
| 3. | 14.2 | 376 | 100 |
| 4. | 12.9 | 392 | 84 |
| 5. | 11.2 | 405 | 70 |

EXAMPLE 3

The procedure is as in Example 2, except that a polyurethane (Ultramoll PU), produced in accordance with German Pat. No. 1,193,241 is used as component (C). The results are shown in Table 4.

TABLE 4

| | Composition parts, by weight PVC A | ACN B | PU C | Shore hardness 15" DIN 53 505 A | D | Tensile strength DIN 53 455 MPa |
|---|---|---|---|---|---|---|
| 1. | 60 | — | 40 | 97 | 53 | 25.2 |
| 2. | 60 | 10 | 30 | 96 | 49 | 24.3 |
| 3. | 60 | 20 | 20 | 92 | 44 | 21.5 |
| 4. | 60 | 30 | 10 | 88 | 38 | 21.0 |
| 5. | 60 | 40 | — | 84 | 32 | 23.5 |

| | Strain at 100% elongation MPa | Elongation at break % | Tear propagation resistance DIN 53 515 KN/m |
|---|---|---|---|
| 1. | 15.0 | 379 | 107 |
| 2. | 15.4 | 346 | 103 |
| 3. | 12.1 | 346 | 86 |
| 4. | 11.0 | 376 | 79 |
| 5. | 11.5 | 392 | 72 |

EXAMPLE 4

The procedure is as in Example 2, except that a soluble ethylene/vinyl acetate copolymer (vinyl acetate content 70%, by weight) having a molecular weight of 200,000 is used as component (C). The results are shown in Table 5.

TABLE 5

| Composition parts, by weight | | | Shore hardness 15" DIN 53 505 | | Tensile strength DIN 53 455 |
|---|---|---|---|---|---|
| PVC A | ACN B | EVAC C | A | D | MPa |
| 1. 60 | — | 40 | 99 | 69 | 24.8 |
| 2. 60 | 10 | 30 | 98 | 62 | 22.1 |
| 3. 60 | 20 | 20 | 96 | 54 | 24.5 |
| 4. 60 | 30 | 10 | 91 | 44 | 21.5 |
| 5. 60 | 40 | — | 84 | 33 | 22.5 |

| | Strain at 100% elongation MPa | Elongation at break % | Tear propagation resistance DIN 53 515 KN/m |
|---|---|---|---|
| 1. | 19.4 | 233 | 130 |
| 2. | 15.6 | 261 | 98 |
| 3. | 13.1 | 342 | 83 |
| 4. | 11.1 | 373 | 73 |
| 5. | 11.2 | 405 | 70 |

EXAMPLE 5

The procedure is as in Example 2, except that chlorinated low pressure polyethylene (chlorine content 35.1%, molecular weight 180,000) is used as component (C).

The results are set out in Table 6.

TABLE 6

| Composition parts, by weight | | | Shore hardness 15" DIN 53 505 | | Tensile strength |
|---|---|---|---|---|---|
| A | B | C | A | D | DIN 53 455 MPa |
| 1. 60 | — | 40 | 98 | 45 | 4.9 |
| 2. 60 | 10 | 30 | 98 | 52 | 10.7 |
| 3. 60 | 20 | 20 | 99 | 57 | 23.6 |
| 4. 60 | 30 | 10 | 92 | 38 | 23.7 |
| 5. 60 | 40 | — | 84 | 33 | 22.5 |

| | Strain at 100% elongation MPa | Elongation at break % | Tear propagation resistance DIN 53 515 KN/m |
|---|---|---|---|
| 1. | 6.2 | 169 | 38.7 |
| 2. | 10.9 | 115 | 55.2 |
| 3. | 15.0 | 309 | 95.0 |
| 4. | 12.0 | 357 | 83.8 |
| 5. | 11.2 | 405 | 70.0 |

EXAMPLE 6

Mixtures are prepared in the same way as in Example 1 from:
(A) EVAC/VC graft polymer containing 50% of EVAC which contains 45%, by weight, of vinyl acetate and 55%, by weight, of ethylene;
(B) adipate/carbonate mixed esters produced by method 8a.

The components are mutually compatible and give transparent moulded plates. The physical properties and constitution of the compositions are shown in Table 7.

TABLE 7

| | EVAC/VC graft polymer parts, by weight | Polyester produced by method 8a parts, by weight | DIN 53505 Shore hardness 15" | |
|---|---|---|---|---|
| | | | A | D |
| 1. | 90 | 10 | 85 | 30 |
| 2. | 80 | 20 | 65 | 20 |
| 3. | 70 | 30 | 54 | 14 |
| 4. | 60 | 40 | 45 | 10 |
| 5. | 50 | 50 | 37 | 6 |

| | DIN 53455 tensile strength MPa | DIN 53455 strain at 100% elongation MPa | DIN 53455 breaking elongation % | DIN 53515 tear propagation resistance |
|---|---|---|---|---|
| 1. | 15.8 | 5.9 | 377 | 39.8 |
| 2. | 14.4 | 3.7 | 461 | 27.5 |
| 3. | 9.4 | 1.6 | 508 | 24.1 |
| 4. | 7.4 | 1.7 | 576 | 20.7 |
| 5. | 3.4 | 0.9 | 573 | 16.6 |

We claim:

1. A thermoplastic molding composition comprising a mixture of
   (a) 10 to 95% by weight of a vinyl chloride polymer and
   (b) 90 to 5% by weight of an adipate/carbonate mixed ester of the formula $$HO\left[X-O-\overset{O}{\underset{\|}{C}}(O-X'-O-\overset{O}{\underset{\|}{C}})_n-O\right]_m Ar$$

wherein
Ar is aryl of 6 to 18 carbon atoms;
X and X' are independently polyester moieties of adipic acid and polyhydric alcohol with the polyester molecular weight being 800 to 3500;
n is an integer from 0 to 10 and
m is an integer from 22 to 100.

2. The molding composition of claim 1 wherein said mixed ester is the transesterification reaction product of an adipate polyester having terminal hydroxyls and a bifunctional carbonic acid aryl ester.

3. The molding composition of claim 1 additionally containing from 10 to 45% by weight of components (a) and (b) of polymeric plasticizer.

4. The molding composition of claim 3 wherein said plasticizer is selected from the group consisting of
   (a) butadiene/acrylonitrile copolymer containing from 25 to 35% by weight of acrylonitrile units and from 75 to 65% by weight of butadiene units;
   (b) polyurethane containing adipic acid polyester, $C_2$ to $C_6$ diol chain-extender and a diisocyanate;
   (c) ethylene/vinyl acetate copolymer containing from 60 to 20% by weight of ethylene units and from 40 to 80% by weight of vinyl acetate units; and
   (d) chlorinated low pressure polyethylene containing from 28 to 42% by weight of chlorine.

* * * * *